INVENTORS W. P. MASON
R. N. THURSTON
BY H. O. Wright
ATTORNEY

INVENTORS W. P. MASON
R. N. THURSTON
BY H. O. Wright
ATTORNEY

Sept. 29, 1959 W. P. MASON ET AL 2,906,971

TORSIONAL VIBRATIONAL WAVE FILTERS AND DELAY LINES

Filed Feb. 10, 1956 4 Sheets-Sheet 3

INVENTORS W. P. MASON
R. N. THURSTON

BY H. O. Wright
ATTORNEY

FIG. 12
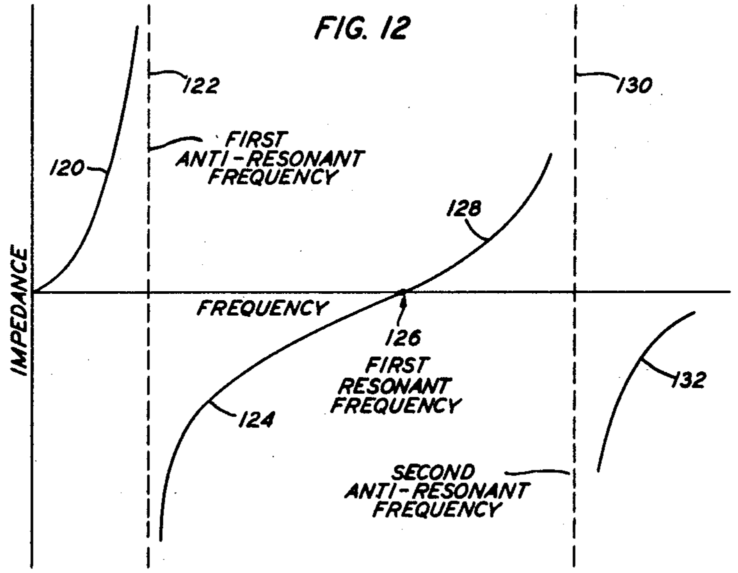
FIG. 13
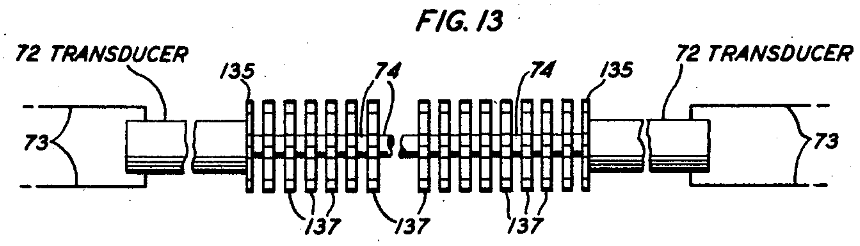
FIG. 14 FIG. 15
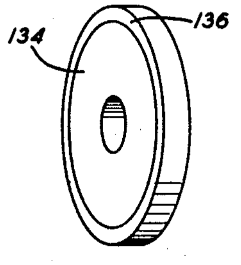
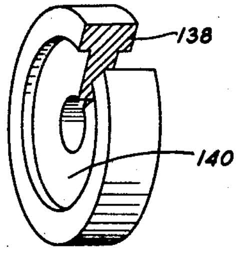
INVENTORS W. P. MASON
R. N. THURSTON
BY H. O. Wright
ATTORNEY United States Patent Office 2,906,971

Patented Sept. 29, 1959

2,906,971

TORSIONAL VIBRATIONAL WAVE FILTERS AND DELAY LINES

Warren P. Mason, West Orange, and Robert N. Thurston, Whippany, N.J., assignors to Bell Telephone Laboratories, Incorporated, New York, N.Y., a corporation of New York Application February 10, 1956, Serial No. 564,682

4 Claims. (Cl. 333—71)

This invention relates to novel torsional vibrational wave filters and delay lines using closely spaced thin discs or "spiders" mounted concentrically on a shaft. More particularly, it relates to novel torsional vibrational wave filters and delay lines in which many sections providing high discrimination or relatively large delays can be realized by structures occupying very limited amounts of space.

In one form, a typical structure of the invention comprises a relatively thin shaft, rod or bar of uniform cross-sectional area having mounted thereon closely and regularly spaced substantially identical, concentric, annular, discs, the thickness of each disc being substantially equal to the space between it and the next successive disc, except that the discs at each end of the row of discs may commonly be only one-half the thickness of the remainder of the discs. The disc thickness and inter-disc spacings will, in general, be not greater than one-eighth wavelength and the disc diameter will usually be several times that of the rod or bar upon which it is mounted.

In an alternate form, each disc may be replaced by a "spider" comprising a plurality of bars arranged in balanced relation about the longitudinal center line of the central rod or bar.

The arrangements of the invention are adapted to be driven from one end by a suitable electromechanical transducer providing torsional vibrational wave energy of a suitable single frequency or of a band of frequencies. A second similar transducer is provided at the other end of the rod or bar to reconvert the torsional vibrational wave energy reaching that end into electrical signals. The rod or bar and the discs mounted on it should be of resilient material such as brass, steel, ceramic or the like. One convenient mode of construction is to start with a round bar having the diameter desired for the discs and to mill annular slots at regular intervals along the bar to produce the required ratio of bar to disc diameters, the appropriate disc thicknesses and the appropriate spacings between consecutive discs. Alternatively, tightly fitting, annular discs can, of course, be assembled on the rod and, if necessary, they may be cemented, welded, or otherwise firmly fixed at their respective positions along the rod. The discs are, of course, not necessarily of the same material as the rod. Furthermore, the discs can, obviously, be flanged or otherwise weighted around their outermost peripheries to increase their effective moments of inertia.

Suitable torsional vibrational transducers of several types are well known to those skilled in the art. By way of example, several are disclosed and claimed in W. P. Mason's copending application Serial No. 514,914 filed June 13, 1955, which matured into Patent 2,880,334, granted March 31, 1959, and in R. N. Thurston's copending applications Serial Nos. 528,461 and 528,462, respectively, both filed August 15, 1955. These Thurston applications matured into Patents 2,838,695 and 2,838,696, respectively, both granted on June 10, 1958.

Where the material of which the assembly is made is a ceramic such as barium titanate, the transducers can be "built into" the ends of the rod as taught in W. P. Mason's copending application Serial No. 351,841, filed April 29, 1953, which matured as Patent 2,742,614, granted April 17, 1956. All of the above-mentioned copending applications are assigned to applicants' assignee. Transducers may also be inserted at one or more intermediate points between the ends of the structure to obtain a plurality of responses having known different time delays with respect to the applied energy, as disclosed, for example, in W. P. Mason's copending application Serial No. 493,025, filed March 8, 1955, and assigned to applicants' assignee. This application matured into Patent 2,828,470, granted March 25, 1958. Furthermore, as a result of the reflection of energy at the receiving transducer, one or more "echoes" of reduced amplitude of the originally applied signal may be discernible at the receiving transducer, such echoes being spaced at intervals of twice the delay incurred by that portion of the signal which passes directly through the device from the transmitting to the receiving transducer. There are, further, disclosed in the present application forms of torsional vibrational wave energy transmission devices, which can be wave filters or delay lines, arranged to employ magnetostrictive transducers at each end and also at intermediate points along the structure, if so desired.

In general, the arrangements of the invention can be considered as being low and band pass filters for torsional vibrational wave energy. As is well known to those skilled in the art, this type of filter will pass all frequencies from zero to a first cutoff frequency, and a band of frequencies higher than said first cutoff frequency delimited by second and third cutoff frequencies. Conversely, it will attenuate all frequencies between said first cutoff frequency and the lower cutoff frequency of its pass band, as well as all frequencies above the upper cutoff frequency of its pass band.

These general characteristics of arrangements of the invention result from the fact that each thin disc, or thin spider, can, within limits dictated by practical considerations to be discussed in some detail below, be viewed as comprising the mechanical equivalent of a section of an electrical transmission line short-circuited at its outer, or free, end, so that for torsional vibrational energy, as the frequency is increased, a first "critical frequency" is reached at which antiresonance (sometimes called parallel resonance) of the disc or spider takes place, i.e., the effective length of the "section of line" is for that frequency one-quarter wavelength long. Increasing the frequency beyond this first "critical frequency" will eventually result in reaching a second "critical frequency" at which the effective length of the "line" is one-half wavelength long and the disc or spider becomes resonant (sometimes called series resonant). Further increase of frequency will similarly, of course, result in reaching a frequency at which the effective length of the "line" is three-quarters of a wavelength long and the disc or spider again becomes antiresonant, i.e., it reaches its second antiresonant (or parallel resonant) frequency.

Theoretically this process could be continued indefinitely but practical considerations, such as the development of unwanted modes of vibration within the disc or spider, usually limit the use of structures of the invention to a frequency range not greatly exceeding the frequency at which the discs or spiders reach their second antiresonant frequency.

Since the spacings between consecutive discs or spiders are relatively short, the short sections of shaft upon which they are mounted can be considered at relatively low frequencies as contributing merely a "shunt" compliance, or capacitance, to the equivalent electrical schematic diagram of the structure, and at the higher frequencies, within the practically useful frequency range, as contributing, by virtue of its inertia a small "inductive" component, in addition to its shunt compliance, to each adjacent series arm of the equivalent electrical schematic diagram of the overall structure.

In view of the fact that over particular portions of the practically useful frequency range, the effects of one or more of the three "critical frequency responses" abovementioned may be negligible or, conversely, may be of paramount significance, arrangements of the invention can be designed for use at specific limited portions only of the frequency range, by taking into consideration only those "critical frequency responses," if any, which substantially affect the operation of the structure at the chosen limited frequency range. This matter is of particular interest in connection with filters which are to be employed to take advantage of the delay characteristics of the filter over a relatively narrow portion only of its transmitting band of frequencies. Such devices are commonly referred to as delay lines.

A primary object of the invention is to provide torsional vibrational wave filters and delay lines having relatively sharp and effective discrimination and relatively long delay, respectively, but nevertheless requiring very limited physical space.

Numerous and varied other objects, features and advantages of the invention will become apparent during the course of the following detailed description of specific illustrative structures of the invention and from the appended claims.

In the accompanying drawings:

Fig. 12 is an impedance diagram illusrating the effect of slotting the discs of structures of the invention as illustrated in Fig. 11;

Fig. 13 illustrates a structure of the invention of the type shown in Fig. 7 but using "spiders" as shown in Fig. 11 in place of discs; and Figs. 14 and 15 illustrate alternate ways of increasing the torsional vibrational inertia of discs to be used in structures of the invention.

Figure 1:
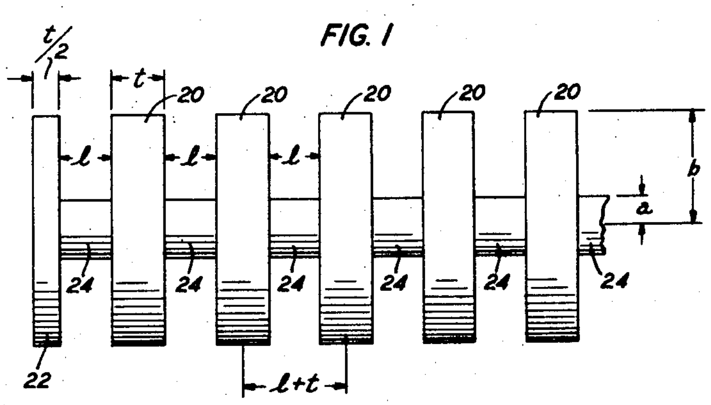
Fig. 1 is a diagram employed in explaining preferred relative dimensions of the rod, the discs and the disc spacings in specific arrangements of the invention.

In more detail, in Fig. 1 a generic arrangement involved in many of the structures of the invention is diagrammatically illustrated. In general, as illustrated in Fig. 1, a plurality of discs 20, 22 of radius $b$ are mounted at uniform intervals $l$ along a shaft or rod 24 of radius $a$. All discs 20 are of thickness $t$, but end discs, such as disc 22, are commonly of half thickness, that is $t/2$, as shown. Each portion of this structure, taken from the vertical center line of one disc 20 to the vertical center line of a next adjacent disc 20 (a length of $l+t$), comprises a full "mid-series terminated" section of the structure, for reasons which will be apparent to those skilled in the art in the course of the description hereinunder of such structures. The half thickness disc 22 at the left end of the structure provides a mid-series termination for the overall structure at that end, for the same reasons. The thickness $t$, the spacing $l$ and the diameter $2a$ of rod 24 are all preferably less than one-eighth of a wavelength of the lowest torsional vibrational frequency with which the structure is to be operated. In general, $l$ and $t$ will, as a matter of convenience, usually be made substantially equal but are not necessarily so, as will presently become apparent.

A number of operational characteristics of the general type of structure illustrated diagrammatically in Fig. 1 can be deduced, as has been indicated hereinabove, from the impedance versus torsional vibrational frequency characteristic of a single disc, a typical impedance characteristic of a disc being illustrated in Fig. 2.

Figure 2:
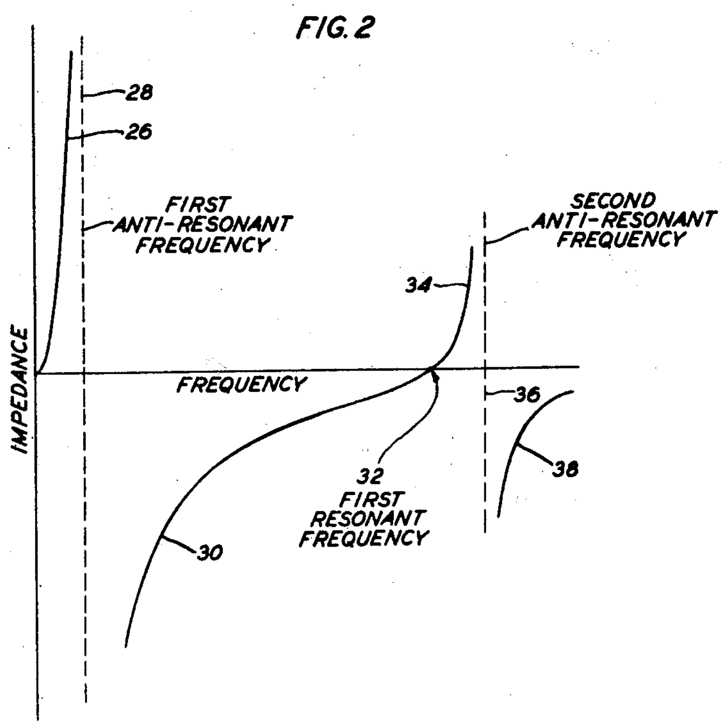
Fig. 2 illustrates the variation of the mechanical impedance of a single, thin, annular disc of the type contemplated for use in arrangements of the invention, as the frequency of the torsional vibrational wave energy drive thereon is increased.

At low frequencies of torsional vibrational energy drive the disc performs as though it were a rigid element, and its mechanical impedance is substantially the equivalent of a simple electrical inductance as illustrated by the lower portion of curve section 26 of Fig. 2. However, as the frequency is increased, the disc approaches an antiresonant condition (sometimes called parallel resonant) passing through antiresonance at a frequency represented by broken vertical line 28 of Fig. 2, so that in the vicinity of said antiresonant frequency the mechanical impedance of the disc is substantially the equivalent of an electrical circuit comprising an inductance and a capacitance in parallel, said circuit becoming antiresonant (or parallel resonant) at the corresponding electrical frequency.

As the frequency is still further increased, the disc approaches its first resonant (series resonant) frequency, as represented at point 32 of Fig. 2, where curve portions 30 and 34 intersect the frequency axis, and its impedance in the vicinity of point 32 is substantially the equivalent of an electrical circuit comprising an inductance connected in series with a capacitor, said circuit becoming resonant (series resonant) at the corresponding electrical frequency.

Increasing the frequency above point 32, it is found that the disc reaches a second antiresonant (or parallel resonant) condition at a frequency respresented by broken line 36 and that in the vicinity of this frequency, and in view of the relative proximity to the resonant frequency 32, the impedance of the disc is substantially the equivalent of an electrical circuit comprising, by way of example, an inductance and a capacitor connected in parallel, the combination being connected in series with a second capacitor.

The impedance variation of the disc with frequency is accordingly seen to resemble that of a section of transmission line, short-circuited at the far end, except that the antiresonant and resonant frequencies are not equally spaced on the frequency scale, the first resonance 32 being, as shown in Fig. 2, much closer to the second antiresonance (parallel resonance) than to the first antiresonance of the disc. The curve given in Fig. 2 is for a ratio of $b$ to $a$ of Fig. 1 (radius of disc to radius of center rod or shaft) of 5. The asymmetry in the spacing of the critical frequencies (i.e., the parallel and series resonances) will, in general, be greater the greater the above-mentioned ratio of radii. The asymmetrical spacing of the critical frequencies may be thought of as arising from the fact that the disc is for torsional vibratory energy, a "tapered' rather than a "uniform" section of short-circuited transmission line, since both the mass and compliance (inductance and capacity) change progressively as the outer periphery of the disc is approached from the center of the disc. One simple way of obtaining a more uniform distribution of the critical frequencies along the frequency scale, while retaining many of the advantages of the disc will be explained hereinafter in connection with the structure of Fig. 11..

Figure 3:
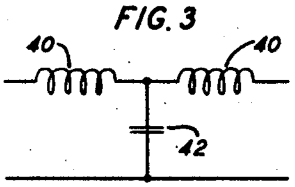
Fig. 3 is a schematic diagram of the equivalent electrical circuit of a single section of a structure of the invention at frequencies well below the first antiresonant (or parallel resonant) frequency of the discs of said structure.

Since, as above-described, at relatively low frequencies (i.e., frequencies substantially below the first antiresonance or parallel resonance of the disc) each disc can be considered as equivalent electrically to a simple inductance and the short section of shaft interconnecting two successive discs can, at the same low frequencies, be considered as a simple compliance, since the effect of its inertia will be neglible, the overall structure of Fig. 1 can be represented by an equivalent electrical circuit comprising a plurality of series connected inductances (the discs) with a capacitance (the shaft section) in shunt relation between each consecutive pair of inductances. The structure thus obtained is a simple multisection low pass filter one section of which is represented, in equivalent electrical schematic diagram form, in Fig. 3. In accordance with a universally accepted convention of the wavefilter art, this filter section of Fig. 3 is a full low pass filter section terminated in "mid-series" at each end, the like coils 40 representing the electrical equivalents of the adjacent halves of two consecutively positioned discs and capacitance 42 representing the compliance of the section of shaft connecting the two discs together. Obviously, a section comprising one full thickness disc, such as a disc 20 of Fig. 1, and a half section of shaft, i.e., a shaft $l/2$ long of Fig. 1, on each side of the disc would constitute a full section terminated in "mid-shunt" at each end.

Figure 4:
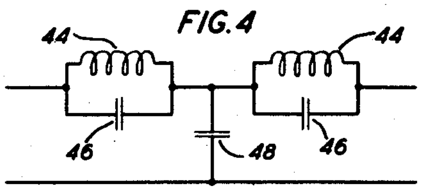
Fig. 4 is a schematic diagram of the equivalent electrical circuit of a single section of a structure of the invention at frequencies in the vicinity of the first antiresonant (or parallel resonant) frequency of the discs of said structure.

However, as the frequency is increased to the vicinity of the first antiresonance frequency of the disc, a full mid-series terminated section of the general structure illustrated in Fig. 1 is more accurately represented, in equivalent electrical schematic diagram form, by the diagram of Fig. 4, each half disc being represented by an inductance 44 in parallel with a capacitance 46. The interconnecting section of shaft can still be represented as a simple shunt connected capacitance 48, the inertial effects of the shaft still being neglibible. The structure of Fig. 4 is still a low pass filter but it will have a lower cutoff frequency than that of Fig. 3 where the inductance values contributed by the half discs of the selected section are comparable.

Figure 5:
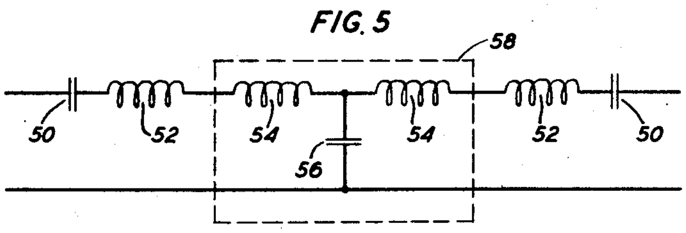
Fig. 5 is a schematic diagram of the equivalent electrical circuit of a single section of a structure of the invention at frequencies in the immediate vicinity of the first series resonant frequency of the discs of said structure.

As the frequency is further increased and approaches the frequency at which the first series resonance of the disc occurs, the inertial effects of the section of shaft can no longer be considered negligible so that the shaft section can be more accurately represented by the portion 58 of the schematic circuit of Fig. 5. Portion 58 comprises the relatively small series inductances 54 and the shunt capacitor 56. Inductance 52 and capacitor 50 on each side of portion 58 represent the adjacent halves of the two consecutively placed discs connected by the shaft section. The small inductances 54 have the effect of slightly increasing the inductance of each series arm of the circuit represented in Fig. 5 and thus slightly lower the frequency at which the series arms become resonant. The structure of Fig. 5 is a section of a band pass filter.

Figure 6:
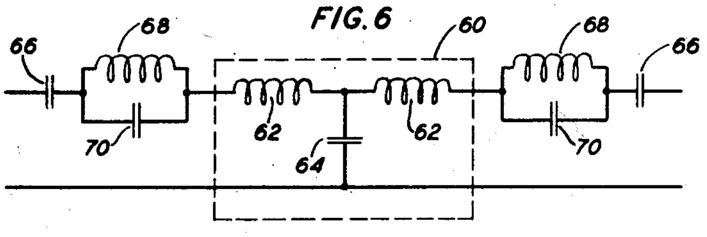
Fig. 6 is a schematic diagram of the equivalent electrical circuit of a single section of a structure of the invention at frequencies in the vicinity of the second antiresonant (or parallel resonant) frequency of the discs of the structure.

Finally, as the frequency is increased to approach that at which the second antiresonant (parallel resonant) frequency of the disc occurs, the section of coupling shaft is again represented by a portion 60 of Fig. 6 similar to portion 58 of Fig. 5, but the half discs are each more accurately represented by an inductance 68 in parallel with a capacitance 70, the parallel combination being connected in series with a second capacitance 66, and therefore a full mid-series terminated section of the overall structure illustrated in Fig. 1 is represented by the schematic diagram of Fig. 6 for frequencies in the vicinity of the second antiresonance (parallel resonance) of the discs. With a relatively large ratio of disc radius to coupling shaft radius $$\left(\frac{b}{a} \text{ of Fig. 1}\right)$$

the first resonant (series resonant) frequency of the disc and its second antiresonant (parallel resonant) frequency may be so closely spaced, as illustrated for example in Fig. 2, that throughout the larger portion of the frequency interval between them the equivalent electrical schematic circuit of Fig. 6 will more accurately simulate the electrical equivalent of the actual physical structure.

Since for arrangements of the present invention the disc thickness and inter-disc spacing must be a small fraction of a wavelength (less than one-eighth wavelength), there is a definite upper frequency limit to the frequency range within which devices of the invention can conveniently be employed. This upper limit appears at present to be in the neighborhood of 1,000 kilocycles. The necessities of avoiding unwanted modes of vibration in the discs as their radii are increased and of unwanted modes of propagation in the coupling shafts also impose limitations which are discussed hereinunder. A lower frequency limit to the practicable range within which devices of the invention can be conveniently employed is imposed by the limitations of the known types of transducers of torsional vibrational wave energy. This lower limit appears at present to be in the neighborhood of 30 kilocycles.

Since the delay time per section of structures of the invention is proportional to the square of the ratio of the disc radius to the shaft radius, i.e., $b/a$ per Fig. 1, a design permitting a large ratio can provide a long delay in a limited length of structure. Ratios of $b/a$ which can, as a practical matter, be realized are, however, limited by the difficulties of forming extremely small diameter coupling shafts, as well as by the difficulties of preventing unwanted modes of vibration in large diameter discs or spiders.

Since coupling shaft sections of length $l$ of Fig. 1 in excess of one-eighth wavelength cannot be accurately represented by a simple shunt capacitor but must be considered as sections of transmission line, a more elaborate analysis, not within the scope of the present application, is required to accurately delineate their properties. Reference may be had to the copending joint application of W. P. Mason and H. J. McSkimin, Serial No. 351,842, filed April 29, 1955, and assigned to applicants' assignee, which matured into Patent 2,774,042 granted December 11, 1956, for related structures differing from those of the present application in that, in the structures of said joint application, the inter-disc coupling shafts are considerably longer than one-eighth wavelength.

It is, in general, very desirable to avoid the propagation of higher order modes by the coupling shaft between consecutive discs. It can be shown that these modes will not be propagated if the parameter $$X=\frac{\omega a}{V}$$

is less than 5.1356, where $\omega=2\pi f$, $f$ being the frequency, V is the velocity of propagation of the torsional vibrational energy along the shaft and $a$ is the radius of the shaft. To ensure rapid attenuation of the higher modes, it is desirable to keep the parameter X below the value 3.85. This same consideration requires that the ratio of disc radius to shaft radius be not less than approximately 2.19 if frequencies up to the second antiresonance are to be employed, or 1.34 if frequencies up to the first antiresonance are to be employed. The upper bound to this radius ratio is that at which the motion of the disc breaks up into modes other than the simple torsional vibrational mode assumed for the purposes of the present application. This is in turn dependent to a considerable degree upon the precision with which the structure is made since slight dissymmetries increase the tendency of the disc motion to degenerate into unwanted modes.

Another limiting consideration is the size of the radii $a$ and $b$ (of Fig. 1) and their ratio $b/a$ for a given frequency. Since, for example, the parameter X for the frequency of the first antiresonance $f_{A_1}$ decreases with increasing radius ratio, the value of the inner (shaft) radius $a$ required for a given frequency of the first antiresonance may become impracticably small and either a lower frequency for the first antiresonance must be accepted or a smaller value of the ratio $b/a$ must be used.

As a qualitative summary relating to the use of structures of the invention in the frequency region containing the band pass portion of their characteristic, the following salient facts are of interest:

(1) The disc resonance is in the pass band.

(2) The inertia of the coupling shaft causes the lower cutoff of the band to be depressed below the disc resonance. This effect is greater for small values of the ratios $b/a$ and $t/l$ (see Fig. 1).

(3) The lower cutoff frequency varies only slightly with the number $m$ of shaft lengths (between discs) per wavelength, if this number is 6 or greater. The cutoff frequency is lowered slightly as this number is lowered.

(4) The upper cutoff frequency is increased markedly as the number $m$ of shaft lengths per wavelength is increased but must always be below the second antiresonance frequency of the discs.

(5) For a given number $m$, the fractional bandwidth decreases with increase of the ratio $b/a$ (fractional bandwidth is the ratio of the bandwidth to the mean frequency of the band).

(6) For a given ratio $b/a$, the fractional bandwidth increases with increase of the number $m$ but there is a finite limiting value as $m$ becomes very large.

(7) For a prescribed minimum shaft diameter, the highest attainable lower cutoff decreases with decreasing fractional bandwidth.

Aside from the difficulties which arise because of the asymmetric spacing of the critical (parallel and series resonant) frequencies, the above analysis of the structures of the invention should suffice to enable those skilled in the art to construct and successfully operate wave filter and delay lines of the invention.

By way of further illustration, several specific structures of the invention will now be described and, in connection with Figs. 11 and 12, a method of realizing a more nearly symmetrical spacing of the critical frequencies will also be described.

Figure 7:
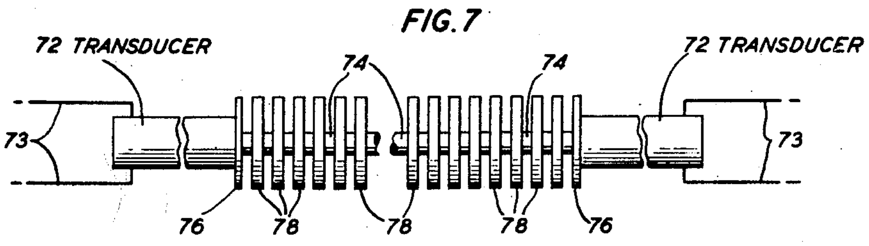
Fig. 7 illustrates a specific torsional vibrational wave energy transmission structure of the invention with the uniform central portion of the structure about its center broken away.

In Fig. 7 a structure of the invention is illustrated which was specifically designed to provide a delay of several hundred microseconds in a structure of very modest overall dimensions. It comprises a cylindrical rod 74 having a diameter of 45 mils with discs 76 and 78 having a diameter of 180 mils mounted at intervals of 20 mils along the rod. The discs 78 are 20 mils thick and the end discs 76 are 10 mils thick, i.e., half the thickness of discs 78. The rod and disc assembly was made by milling the appropriate annular slots in a cylindrical brass rod having the diameter desired for the discs as above specified. The assembly included sixty-three full discs 78 and the two half thickness discs 76. The assembly was designed for operation at a median frequency of 32 kilocycles, the pulsed signal having a bandwidth of 4 kilocycles. The assembly provided a delay of 368 microseconds for a single passage from input to output transducers. The operating frequency (32 kilocycles) was well below the first antiresonance (parallel resonance) of the discs (112 kilocycles) so that the device was operated as a simple low pass filter comprising sixty-four sections of the type illustrated in Fig. 3. The overall length of the rod and disc assembly was approximately 2.5 inches.

The transducers 72 having the connecting leads 73 were of the type illustrated in Fig. 6 of W. P. Mason's copending application, Serial No. 493,025 filed March 8, 1955, and assigned to applicants' assignee. This application matured into Patent 2,828,470, granted March 25, 1958. The overall dimensions of each transducer were 0.10 inch diameter by 1.24 inches long. They were of ceramic, eighty-four percent barium titanate plus eight percent each of lead and calcium titanates.

In view of the resonant properties of the discs of the above-described structure of Fig. 7, it also has a pass band centered at approximately 780 kilocycles having a bandwidth in the order of a half dozen kilocycles. In view of the relatively narrow band, the slope of the phase shift versus frequency characteristic through the pass band will be considerably greater than in the vicinity of 32 kilocycles in the low pass region of the structure. Accordingly the delay afforded to a pulse signal centered about 780 kilocycles, by the structure of Fig. 7 will be several times greater than at 32 kilocycles, i.e., 1,000 or more microseconds. It is thus apparent that devices of the invention occupying a very modest space (180 mils maximum outside diameter by five inches long) are capable of producing very substantial delays. It should be noted that half of the above length is taken up by the transducers. Shorter transducers of less than half the length of those employed in this instance are entirely practicable.

Some difficulty may, however, be encountered in operating the device of Fig. 7 at 780 kilocycles since the frequency intreval between the first resonance and second antiresonance of each disc is quite small (see curve of Fig. 2). Serious nonlinearity of the phase shift versus frequency characteristic and serious distortion of the signal may therefore result.

To eliminate this hazard the discs of the structure of Fig. 7 can be modified to spiders, in the manner illustrated in Fig. 11, so that a more symmetrical spacing of the critical frequencies and a wider separation of the resonance and second antiresonance frequencies, as illustrated in Fig. 12, can be realized, as will be discussed in more detail hereinunder.

Figure 8:
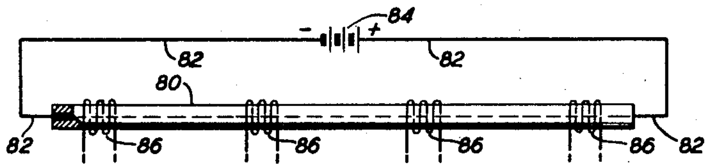
Fig. 8 illustrates a simple form of magneto-strictively driven torsional vibrational delay line arranged to facilitate the tapping of the line at a number of intermediate points between its ends as well as at the end opposite that at which the driving energy is applied.

In Fig. 8 a novel type of delay line is illustrated and comprises a tube 80 of a magnetostrictive material, such as, for example, the ferrite comprising fifty percent NiO and fifty percent $Fe_2O_3$, an insulated wire 82 passing through the central opening in tube 80 and drawing direct current from source 84 to circumferentially polarize tube 80 and for transducer coils 86 wound around tube 80 and spaced at intervals, as shown. An electrical signal introduced into the transducer coil 86 at the left end will then produce torsional vibrational waves in tube 80 which will be transmitted along tube 80 and arrive at the several transducer coils 86 in succession at intervals determined by the distance of each coil from the driving coil. Thus a pulsed signal applied to the left transducer 86 will produce an output pulse in each of the other transducers, the timing of each output pulse with respect to the input pulse being determined as above-described.

Figure 9:
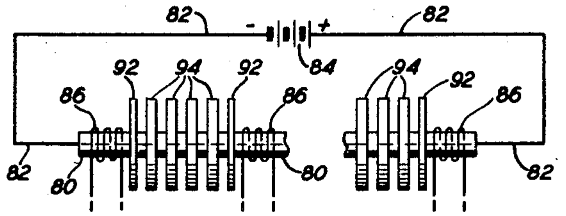
Fig. 9 illustrates the addition of a plurality of like, thin, annular discs evenly spaced along portions of the structure of Fig. 8 with the uniform central portion of the structure about its center broken away.

In Fig. 9, the rod 80, polarizing wire 82, direct current source 84 and transducer coils 86 can all be as described, respectively, in connection with Fig. 8. Discs 92 and 94 have been assembled on rod 80 and uniformly spaced along it between successive transducer coils 86 in substantially the same manner as described for discs 76 and 78, respectively, in connection with Fig. 7 whereby the delay, between successive transducer coils, to torsional vibrational energy is very materially increased. Discs 92 and 94 can, of course, be of nonmagnetostrictive resilient material such as brass, for example, or the overall assembly can be formed from a unitary tube of magnetostrictive material having a diameter equal to that desired for the discs, appropriate annular slots being milled in the tube to provide discs of the desired thicknesses and spacing and to provide intervals in which transducer coils 86 can be applied. The operation of this device as a wave filter or delay line is, obviously, substantially the same as for the device of Fig. 7 as described in detail above, except for the magnetostrictive drive.

Figure 10:
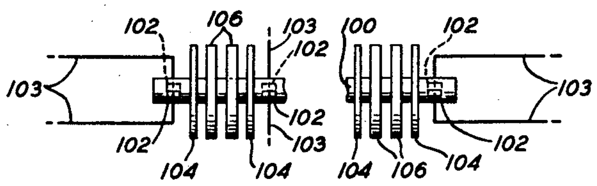
Fig. 10 illustrates a structure of the invention of the general type illustrated in Figs. 7 and 9 but employing a barium titanate rod with electrostatic transducers.

In Fig. 10 a device similar to those described above in connection with Figs. 7 and 9 is illustrated. The device of Fig. 10, however, is formed from a rod 100 of ceramic, comprising, for example, barium, lead, and calcium titanates and hence the transducers including electrodes 102, front and rear, and leads 103, can be "built into" the rod at the desired positions in the manner described in detail in the above-mentioned application Serial No. 493,025 of W. P. Mason. Discs 104, 106 can be of like or dissimilar resilient material to that of rod 100. Again, alternatively, the rod and discs can be formed as an integral assembly by cutting annular slots in a cylindrical rod having, originally, the diameter desired for the discs. Again, the end discs 104 are one-half the thickness of the other discs 106 and the device of Fig. 10 can be operated in substantially the same manner as described hereinabove for the device of Fig. 7.

Figure 11:
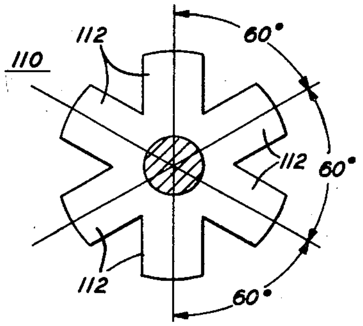
Fig. 11 illustrates one method of slotting the discs of devices of the invention to form "spiders" to provide a more uniform spacing between the successive antiresonant and resonant frequencies of the slotted discs or "spiders"

In Fig. 11 a "spider" or improved form of inertia loading element 110, to be substituted for the annular discs in structures such as those illustrated in Figs. 7, 9 and 10, is illustrated. It can, obviously, be formed from an annular disc by removing V-shaped sections to leave a plurality of arms or bars symmetrically arranged about the longitudinal axis of the rod or shaft upon which it is to be mounted. The widths of the arms 112 are, preferably, slightly greater than the diameter of the shaft so that an adequate amount of material remains to support the element 110 when assembled on the shaft. The thickness of the arms is preferably as specified above for the discs to be replaced. Any balanced arrangement of arms can be used but, obviously, an arrangement which leaves a substantial portion of the original disc in the modified element will retain a corresponding portion of the inertia of the discs. Alternatively, "spider" loaded lines can obviously be formed from a unitary bar of material by cutting appropriate longitudinal V-shaped slots in the bar in addition to the annular slots cut as described above to form discs.

Fig. 12 illustrates the general form of the impedance characteristic 120, 124, 128, 132 of the "spider" 110 of Fig. 11. As compared with that of the disc, as illustrated in Fig. 2, the first antiresonant frequency 122 will occur at a higher frequency, and the first series resonant frequency 126 will be more nearly centered between the first and second antiresonant frequencies 122 and 130 as shown. This results in a substantially more linear phase shift versus frequency characteristic over the pass band of the structure and a corresponding decrease in the distortion of signals transmitted within the pass band through a structure of the invention in which spiders of the type illustrated by Figs. 11 and 12 have been substituted for the discs of Fig. 1.

In Fig. 13 is shown a structure of the invention similar to that of Fig. 7 but in which spiders 137, 135 of the type illustrated in Fig. 11 have been substituted for the discs 78, 76, respectively, of Fig. 7. Like elements of the two figures have been given corresponding designation numbers in Fig. 13 and are as described above in connection with Fig. 7. This structure will operate substantially as described hereinabove for the structure of Fig. 7 except that the resonance (series resonance) frequency of the spiders will be more widely separated in frequency from the second antiresonance frequency of the spiders than the corresponding frequencies of the discs of Fig. 7 and consequently the slope of the phase shift of the overall structure throughout its pass band will be more nearly linear. The structure of Fig. 13 will therefore provide a more stable and reliable delay structure and/or pass band characteristic at frequencies within its pass band than the structure of Fig. 7.

In Fig. 14, one simple method of increasing the torsional vibrational inertia of a disc for use in structures of the invention, such as those illustrated in Figs. 7, 9 and 10, is shown. It comprises simply the inclusion of a rim 136 of lead on the outer periphery of the disc 134.

In Fig. 15, a second simple method of increasing the torsional vibrational inertia of a disc is illustrated and comprises simply adding a flanged portion 138 at the outer periphery of the disc 140.

Obviously, the "spider" type of resonant inertia element illustrated in Fig. 11 can be similarly loaded to increase its inertia by adding a lead tip or a flange to the end of each leg of the spider.

Numerous and varied other applications of the principles of the invention will readily occur to those skilled in the art. The above-described specific embodiments are illustrative but by no means exhaustively cover all arrangements clearly within the spirit and scope of the invention.

What is claimed is:

1. An electromechanical torsional vibrational wave energy transmission device which comprises a first and a second electromechanical transducing means for converting electrical signals into torsional vibrational wave energy and vice versa, and a torsional vibrational wave energy transmitting means mechanically interconnecting said first and said second transducing means, wherein said wave energy transmitting means comprises an elongated resilient shaft member extending between said first and second transducing means and having a maximum cross-sectional dimension of less than one-eighth wavelength in the torsional mode of the lowest frequency to be transmitted and a plurality of like members each in the form of a resilient spider having a plurality of arms symmetrically arranged with respect to the longitudinal axis of said shaft member, the spiders having substantial torsional vibrational inertia fixed concentrically and transversely on said shaft member and spaced along substantially the entire extent of said shaft member at substantially equal intervals between successive members of not greater than one-eighth wavelength in the torsional mode of said lowest frequency, the thickness of each said transverse member in a direction parallel to the direction of said shaft member being substantially equal to the interval between successive transverse members, the maximum dimension of said transverse members substantially exceeding and being not greater than five times the maximum cross-sectional dimension of said shaft member.

2. A torsional vibration wave filter adapted to transmit a predetermined band of ultrasonic frequencies and suppress predetermined ranges of frequency adjacent each extremity of the band, the filter comprising an elongated cylindrical rod having a diameter of less than one-eighth wavelength in the torsional mode of the median frequency of the band, a plurality of like symmetrical transverse members concentrically mounted at regular intervals along the rod, the thickness of each transverse member and the interval between each two consecutive members being less than one-eighth wavelength in the torsional mode of the median frequency of the band, each transverse member being resonant to torsional vibrational energy at a frequency within the predetermined band and antiresonant at a frequency near the highest frequency of the band, the ratio $$\frac{\omega a}{V}$$

being less than 3.85, where $a$ is the radius of the rod, $\omega$ is $2\pi$ times the median frequency of the band and V is the velocity in the torsional mode of the vibrational energy along the rod, the ratio of rod diameter to the maximum transverse dimension of the transverse members being not less than 2.19 and not more than five.

3. The filter of claim 2 in which the transverse members are spiders having a plurality of arms symmetrically arranged with respect to the longitudinal axis of the rod.

4. The filter of claim 2 in which the transverse members are discs concentrically mounted on the rod.

References Cited in the file of this patent

UNITED STATES PATENTS

| | | |
|---|---|---|
| 1,678,116 | Harrison | July 24, 1928 |
| 1,681,554 | Norton | Aug. 21, 1928 |
| 2,501,488 | Adler | Mar. 21, 1950 |
| 2,695,357 | Donley | Nov. 23, 1954 |
| 2,742,614 | Mason | Apr. 17, 1956 |